United States Patent
Sanchelli

(10) Patent No.: US 7,063,114 B2
(45) Date of Patent: Jun. 20, 2006

(54) SNOW MITT/SNOW GLOVE FOR SNOW SHOVEL

(76) Inventor: Barbara Ann Sanchelli, 10C Utah Dr., Matawan, NJ (US) 07747

( * ) Notice: Subject to any disclaimer, the term of this patent is extended or adjusted under 35 U.S.C. 154(b) by 123 days.

(21) Appl. No.: 10/892,558

(22) Filed: Jul. 16, 2004

(65) Prior Publication Data

US 2006/0010724 A1    Jan. 19, 2006

(51) Int. Cl.
*B65D 56/02*    (2006.01)
*B65D 85/00*    (2006.01)
*E01H 5/02*    (2006.01)
*E02F 3/00*    (2006.01)

(52) U.S. Cl. .......................... 150/161; 37/285; 37/466; 37/903

(58) Field of Classification Search .................. 220/6, 220/7, 4.01, 4.21–4.23, 253, 810, 836, 837, 220/839, 847, 345.5; 150/161; 2/300, 301; 37/264–267, 285, 466, 903
See application file for complete search history.

(56) References Cited

U.S. PATENT DOCUMENTS

| 1,138,305 | A | | 5/1915 | Miller |
| 2,190,811 | A | * | 2/1940 | Van Zeeland ............... 15/235.4 |
| 2,269,424 | A | * | 1/1942 | Bernstein ..................... 15/228 |
| 2,639,454 | A | | 5/1953 | Dory |
| 2,815,521 | A | * | 12/1957 | Winckler ..................... 15/118 |
| 3,380,504 | A | | 4/1968 | Green |
| 4,550,943 | A | | 11/1985 | Mirto |
| 4,848,819 | A | | 7/1989 | Moorefield |
| 5,067,197 | A | | 11/1991 | Cormier |
| 2003/0173390 | A1 | * | 9/2003 | Smith ......................... 224/604 |

* cited by examiner

*Primary Examiner*—Christopher J. Novosad
(74) *Attorney, Agent, or Firm*—Charles I. Brodsky

(57) ABSTRACT

An envelope of felt (or other fabric resistant to snow adhesion) into which a regular eighteen—twenty-two inch size snow shovel may be inserted, folded over to enclose the shovel and temporarily clasped in place by snaps or Velcro—and reinforceable in the area where the shovel blade would rest so as to afford optimal protection against marring the finish of a car or sport utility vehicle when the shovel handle is grasped in pushing snow from off the vehicle.

15 Claims, 1 Drawing Sheet

SNOW MITT/SNOW GLOVE FOR SNOW SHOVEL

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the cleaning of accumulated snow, in general, and to the clearing of accumulated snow from such automotive vehicles as automobiles and sport utility vehicles, in particular.

2. Description of the Related Art

As is well known and understood, automotive supply stores, supermarkets and large retail store chains all make available for sale various types of devices to clean snow accumulations from cars, vans, and small utility trucks at the beginning of, and during each, snow season. Typically, such devices have a bristle brush at one end, and a scraper or squeegee at the opposite end. Recognizing that in some instances the bristle brush would only be effective for clearing light, powdery snow from the vehicle, other designs sometimes employ a small shovel instead of a scraper or squeegee to try to clear heavier accumulations. With either arrangement, however, only a limited amount of snow can be cleaned with each arm movement—and the wetter the snow is, or the more it has accumulated, the more difficult it is to clear it effectively. This becomes all the more so once it is appreciated that such devices come of limited lengths; then a user oftentimes has to open one of the vehicle doors to stand on its floorboard to try to reach over to its roof in attempting to clean the snow that accumulates there. But, by opening the door to gain a foothold, the snow that has gathered gets blown or falls into the vehicle, wetting its seats. While using a broom to clear the hood, the roof and the rear deck of the vehicle might appear to be a better alternative, to do so requires the coordinated rotation of both arms holding onto the handle of the broom in a sweeping action—which becomes harder to do the wetter the snow and the higher it piles on the vehicle. And, while the broom may be more effective than the bristle brush device in some respects, it becomes quite a task to use as the sweep widens, simply from the added weight of the snow being moved.

SUMMARY OF THE INVENTION

The present invention has as its starting point the recognition that almost everyone who leaves an automobile or sport utility vehicle outside during the winter snow season also owns a snow shovel. Understanding that snow shovels are often used to clear snow from walks and driveways by a "pushing" action, the invention employs a similar "push-type" shoveling action in clearing the snow from these automotive vehicles. Appreciating that the use of a snow shovel on an automobile or sport utility vehicle could mar its finish when pushing the snow, the present invention utilizes an envelope of fabric into which the snow shovel is first inserted. With a fabric which exhibits a resistance to retaining snow on its surface, a significantly reduced effort follows in pushing the snow off the vehicle. Utilizing an envelope to receive an 18–22 inch wide snow shovel then results in a wider swath each time, and a more efficient snow removal than with the wrist where the snow is only flicked and brushed off. In a preferred embodiment of the invention, the sides of the envelope are sewn and the envelope temporarily closed about the shovel by snaps or a Velcro-type hook and loop adhesive. The fabric is reinforced in the area where the blade of the shovel rests so as to afford further protection against scratching the vehicle's surface.

As such, the snow mitt/snow glove for a snow shovel according to the present invention, differs from several issued patents which might arguably be said to be somewhat akin to it:

a. U.S. Pat. No. 1,138,305, for example, shows a cover of cloth or other fabric for application to a broom to be used for hardwood floors or other highly finished surfaces so as to polish the floors without scratching; it doesn't relate to clearing vehicles of snow.

b. U.S. Pat. No. 2,269,424, shows a dust mop in which its head can be formed to work with the surface in which it is to be used, with an overlying bag to secure over the head—the head being described as being of soft pliable material to go under furniture and under radiators, with the bag being replaceable if needed; it too, serves a clearly different purpose.

c. U.S. Pat. No. 2,639,454 shows a pusher and scraper for removing snow and ice from the windshield and glass of a motor vehicle, employing an elastic band of rubber for protecting the paint and finish, and which projects slightly beyond the front and rear surfaces of the block which pushes the snow and ice away; it isn't concerned with a fabric enclosed snow shovel.

d. U.S. Pat. No. 2,815,521 shows an envelope or cover for a dust mop which allows the mop to conform to the shape of such obstructions as furniture legs, floor caps, etc., the provision being made for maintaining a dampened outer edge for cleaning where a dampened cloth is more effective than a dry one; it doesn't relate to any shovel, much less to any enclosed snow shovel.

e. U.S. Pat. No. 3,380,504 describes a cover for a broom used in the sport of curling, in which a pocket or window receives an identification card, and in which Velcro-type hooks and loops are provided to close the cover over the broom; it isn't concerned with snow removal from any automotive vehicle.

f. U.S. Pat. No. 4,550,943 illustrates a snow remover for automobiles including a telescoping handle, a rubber scraper with a base of wood, plastic or metal, and with a manner of easily storing the snow remover away once the handle is collapsed; no fabric envelope encloses its remover during use.

g. U.S. Pat. No. 4,848,819 speaks of the use of brooms, sponge mops, squeegees, ice scrapers and sticks, along with a rake which clears snow by a "pull-action"; no "push-action" for an enclosed snow shovel is described.

h. U.S. Pat. No. 5,067,197 shows another type of snow rake employing an edge which prevents any accumulations of gritty materials which could served to mar the finish of the vehicle as the rake is pulled or pushed to clear snow away; no fabric enclosure which rejects any accumulation of snow on it is set out.

Although the disclosures of these prior patents may work perfectly well for their intended purposes, none of them provide the advantages of the present invention, nor its structure, nor its mode of operation.

BRIEF DESCRIPTION OF THE DRAWINGS

These and other features of the present invention will be more clearly understood from a consideration of the following description taken in connection with the accompanying drawings in which.

DETAILED DESCRIPTION OF THE INVENTION

Figure 1:
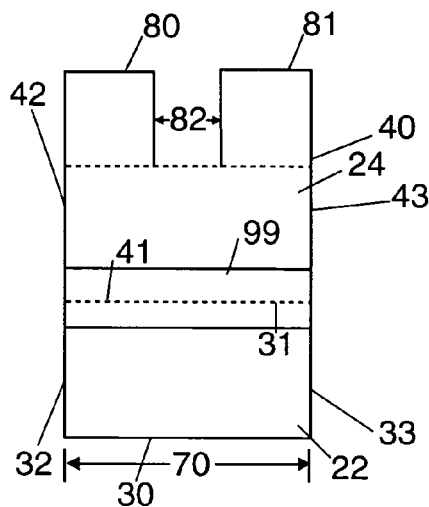
FIG. 1 shows an unassembled snow mitt/snow glove constructed in accordance with the invention, helpful in an understanding of its operation.

In FIGS. 1–4, an envelope for receiving a snow shovel 10 having a blade 12 of given length 14 and height 16 and a handle 18 of given thickness 20 includes a first surface 22 defined by first top, bottom and opposing side edges 30, 31 and 32–33. A second surface 24 is shown, defined by second top, bottom and opposing side edges 40, 41 and 42–43, respectively. First means join the bottom edge 31 of the first surface 32 with the bottom edge 41 of the second surface 24, as by sewing the bottom edges together where the surfaces 22, 24 are manufactured of a fabric composition, such as felt. Second means respectively join individual ones of the opposing side edges 32, 33 of the first surface 22 with individual ones of the side edges 42, 43 of the second surface 24—for example, by seams sewn on the side edges of the fabric surfaces 22, 24. In accomplishing this, the first surface 22 is effectively folded upwardly about the joined edges 31, 41 to overlie the second surface 24, as more clearly shown in FIGS. 2 and 3. An effective opening 60 is thus created, to allow for insertion of the snow shovel 10 within the envelope as a snow mitt or snow glove.

In a preferred embodiment of the invention—for use with snow shovels of blade length between eighteen inches and twenty-two inches—each of the first and second surfaces 22, 24 are of a width 70 a distance as least as great as such length, for example twenty-four inches. At the same time, the height 72 of each of the first and second surfaces 22, 24 is at least as great as the height 16 of the blade 12, for example fifteen inches. In accordance with the invention, a pair of openable closures 80, 81 are included, extending from the top edge of one of the surfaces 22, 24, and particularly shown in FIG. 1 as extending from the top edge 40 of surface 24. Such openable closures are spaced apart a distance 82, at least as great as the thickness 20 of the snow shovel handle 18. The closures 80, 81 are selected of a length to extend over the top of the other surface, to join with that other surface in removably securing the two surfaces in forming the envelope as a mitt or glove to retain the shovel 10, for example 8 inches will be sufficient. A two inch spacing 82 is generally sufficient to surround the snow shovel handle 18.

Figure 2:
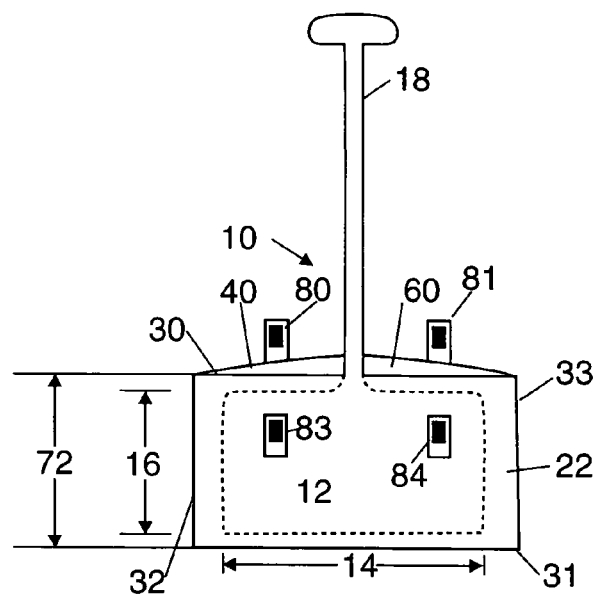
FIGS. 2 and 3 are pictorial views showing a manner of fitting a snow shovel within the snow mitt/snow glove envelope of the invention.
Figure 3:
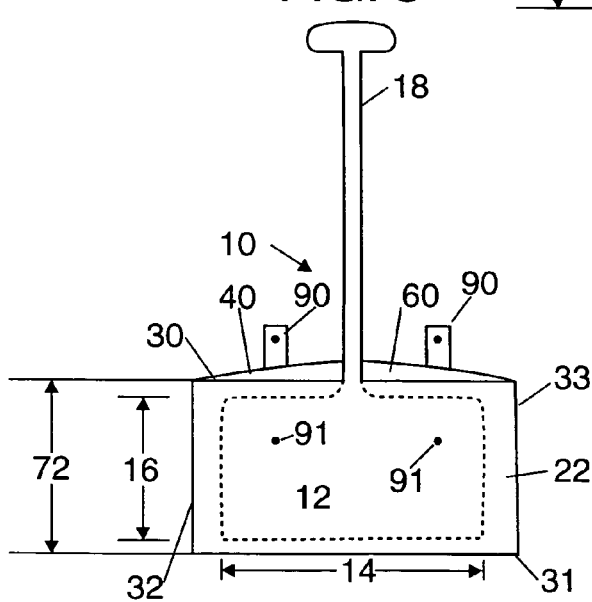
Figure 4:
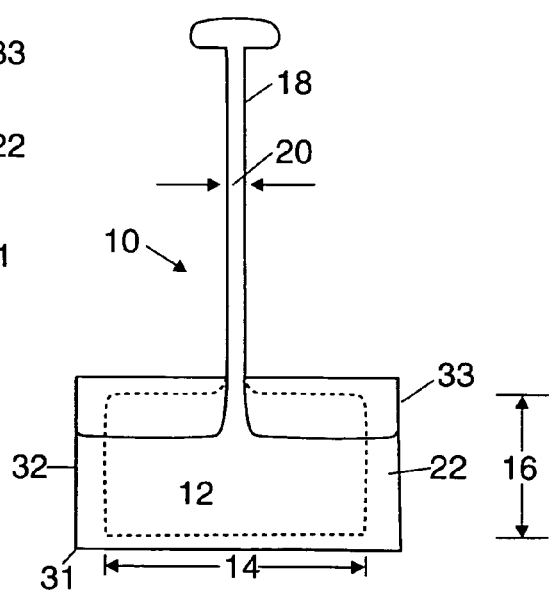
FIG. 4 is a pictorial view of the snow mitt/snow glove and snow shovel combination as it may be utilized or stored away after use.

FIG. 2 illustrates the enclosure of the envelope by employing flaps and removable securement means of the well known Velcro hook-and-loop adhesive type variety. In one construction, the hook component is sewn to the underside of the closure 80 to join with the loop component as 83 on the first surface 22. Likewise, a second hook component is sewn to the underside of the closure 81, to join with a loop component as 84 on the surface 22. A closing of the snow mitt/snow glove envelope about the shovel would then take the general form shown in FIG. 4. Alternatively, the openable closure could comprise entirely a Velcro hook strip, rather than just a portion sewn to the underside of the closure. Obviously, the flap hook and the loop securement could be reversed in which case the appearance of the snow mitt/snow glove shovel combination would take the form of the opposite of FIG. 4. In another construction of the invention, the openable closure could take the form of any type of strap arrangement 90, to join with snaps 91 (or loops or other clasp combinations) in joining the closures 80, 81 to the securements of the opposite surface (FIG. 3).

In either event—or those where other openable closures are secured—the end result is a shovel retained within an envelope, preferably with the envelope being of a fabric composition which resists adhesion to snow to both protect the finish of the automobile or sport utility vehicle as the shovel is pushed forwardly, and to allow the snow accumulation to be easily cleared. In instances where it is desired to further protect the surface finish, an intermediate strip could be added, spanned across the join of the bottom edges 31, 41 of the surfaces 22, 24. Such intermediate strip 99 could be fabricated of a rubberized material, for example of four inch width.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the invention.

I claim:

1. The combination comprising:
   a. an envelope having a first surface defined by first top, bottom and opposing sides edges and a second surface defined by second top, bottom and opposing side edges;
      first means joining said bottom edge of said first surface with said bottom edge of said second surface;
      second means respectively joining individual ones of said opposing side edges of said first surface with individual ones of said opposing side edges of said second surface;
      first and second openable closures extending from said top edge of one of said first and second surfaces over said top edge of the other of said first and second surfaces;
      third means on said other of said first and second surfaces for removably securing with said first and second openable closures in closing said surfaces as a mitt or glove; and
   b. a snow shovel having a blade of given length and height, and a handle of given thickness;
      with said snow shovel being inserted between said top, bottom and opposing side edges of each of said first and second surfaces; and
      with said first and second openable closures of said envelope being spaced apart a distance at least as great as said snow shovel handle thickness.

2. The combination of claim 1 wherein said first and second openable closures comprise a pair of straps and wherein said third means comprise a pair of snaps to respectively secure with said straps.

3. The combination of claim 1 wherein said first and second openable closures comprise a pair of flaps and wherein said third means removably secures with said flaps in closing said surfaces as said mitt or glove.

4. The combination of claim 3 wherein said third means includes one of a hook and loop of a pair of hook-and-loop-adhesives to couple with the other of said hook and loop of said pair of adhesives on individual undersides of each of said over extending first and second flaps.

5. The combination of claim 3 wherein each of said flaps comprise a strip of one of the hook and loop portions of a pair of hook-and-loop-adhesives to couple with said third means comprising the other of said hook and loop portions of said hook-and-loop-adhesives.

6. The combination of claim 1 wherein said first and second surfaces are each of a height of substantially fifteen inches and a length of substantially twenty-four inches.

7. The combination of claim 6 wherein said openable closures are spaced apart a distance of substantially two inches.

8. The combination of claim 7 wherein said openable closures are each of a length of substantially eight inches.

9. The combination of claim 1 wherein said first and second surfaces are fabricated of felt.

10. The combination of claim 1 wherein said first means includes an intermediate strip spanned across said first and second surfaces between both opposing side edges thereof.

11. The combination of claim 10 wherein said intermediate strip is manufactured of a rubberized composition.

12. The combination of claim 1 wherein said top and bottom edges of each of said first and second surfaces are spaced apart a distance at least as great as said snow shovel blade height.

13. The combination of claim 1 wherein said opposing side edges of each of said first and second surfaces are spaced apart a distance at least as great as said snow shovel blade length.

14. The combination of claim 1 wherein said top and bottom edges of each of said first and second surfaces are spaced apart a distance at least as great as said snow shovel blade height, and wherein said opposing side edges of each of said first and second surfaces are spaced apart a distance at least as great as said snow shovel blade length.

15. The combination of claim 14 wherein said first and second surfaces are manufactured of a fabric composition characterized by a resistance to snow adhesion.

* * * * *